United States Patent
Tsuchiya et al.

(10) Patent No.: US 11,377,578 B2
(45) Date of Patent: Jul. 5, 2022

(54) HEAT TRANSFER DEVICE AND HEAT TRANSFER METHOD USING SAME

(71) Applicant: DAIKIN INDUSTRIES, LTD., Osaka (JP)

(72) Inventors: Tatsumi Tsuchiya, Osaka (JP); Kouhei Koba, Osaka (JP); Masaru Tanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 117 days.

(21) Appl. No.: 16/468,040

(22) PCT Filed: Dec. 8, 2017

(86) PCT No.: PCT/JP2017/044207
§ 371 (c)(1),
(2) Date: Jun. 10, 2019

(87) PCT Pub. No.: WO2018/110454
PCT Pub. Date: Jun. 21, 2018

(65) Prior Publication Data
US 2020/0017742 A1    Jan. 16, 2020

(30) Foreign Application Priority Data
Dec. 13, 2016 (JP) .............................. JP2016-241257

(51) Int. Cl.
*C09K 5/04* (2006.01)
*F25B 13/00* (2006.01)

(52) U.S. Cl.
CPC .............. *C09K 5/044* (2013.01); *F25B 13/00* (2013.01)

(58) Field of Classification Search
CPC ...... F25B 43/043; F25B 43/003; F25B 13/00; F25B 43/00; F25B 1/00; C09K 5/044
See application file for complete search history.

(56) References Cited

U.S. PATENT DOCUMENTS 4,476,691 A * 10/1984 Ozu ........................ F25B 41/20
                                                                 62/217
5,180,518 A    1/1993 Sugihara et al.
(Continued)

FOREIGN PATENT DOCUMENTS

| EP | 3 026 368 | 6/2016 |
| JP | 2/284647 | 11/1990 |

(Continued)

OTHER PUBLICATIONS

Extended European Search Report dated Jun. 18, 2020 in corresponding European Patent Application No. 17882212.8.
(Continued)

*Primary Examiner* — Elizabeth J Martin
(74) *Attorney, Agent, or Firm* — Wenderoth, Lind & Ponack, L.L.P.

(57) ABSTRACT

A heat transfer device that contains a circulation route enclosing a refrigerant containing a hydrohaloolefin, the heat transfer device being capable of reducing the influence of oxygen entrapped in the circulation route; and a heat transfer method using the heat transfer device. Also, a heat transfer device that contains a circulation route enclosing a refrigerant containing at least one member selected from the group consisting of hydrofluoroolefins (HFOs), hydrochlorofluoroolefins (HCFOs), and hydrochloroolefins (HCOs); and the device containing an oxygen adsorption device between an evaporator and a compressor present in the circulation route; and a heat transfer method using the same.

7 Claims, 3 Drawing Sheets

(56) References Cited

U.S. PATENT DOCUMENTS

| | | | |
|---|---|---|---|
| 2007/0033955 A1* | 2/2007 | Luo | F25B 47/025 |
| | | | 62/150 |
| 2011/0079040 A1* | 4/2011 | Morimoto | F25B 43/003 |
| | | | 62/474 |
| 2014/0090409 A1 | 4/2014 | Yamashita et al. | |
| 2014/0260252 A1 | 9/2014 | Zyhowski et al. | |
| 2014/0341710 A1 | 11/2014 | Creamer | |
| 2016/0201958 A1* | 7/2016 | Ueda | C09K 5/044 |
| | | | 62/474 |
| 2016/0273795 A1* | 9/2016 | Takenaka | F25B 47/022 |
| 2017/0146271 A1* | 5/2017 | Hasegawa | F04D 29/0566 |
| 2017/0174965 A1 | 6/2017 | Tsuchiya et al. | |
| 2017/0254568 A1 | 9/2017 | Miyoshi et al. | |
| 2017/0335230 A1* | 11/2017 | Matsumoto | C10M 127/02 |
| 2018/0164007 A1* | 6/2018 | Tsuboe | F25B 13/00 |

FOREIGN PATENT DOCUMENTS

| | | |
|---|---|---|
| JP | 2004/28359 | 1/2004 |
| JP | 2005-257263 | 9/2005 |
| JP | 2007-315663 | 12/2007 |
| JP | 2010-531970 | 9/2010 |
| JP | 2011-237146 | 11/2011 |
| JP | 2013-502489 | 1/2013 |
| JP | 2014-211157 | 11/2014 |
| JP | 2015-196702 | 11/2015 |
| JP | 2016-33348 | 3/2016 |
| JP | 2016-56966 | 4/2016 |
| JP | 2016-98280 | 5/2016 |
| WO | 2008/027511 | 3/2008 |
| WO | 2009/114398 | 9/2009 |
| WO | 2009/157325 | 12/2009 |
| WO | 2011/022260 | 2/2011 |
| WO | 2012/172597 | 12/2012 |

OTHER PUBLICATIONS

International Search Report dated Feb. 20, 2018 in International (PCT) Application No. PCT/JP2017/044207.

* cited by examiner

HEAT TRANSFER DEVICE AND HEAT TRANSFER METHOD USING SAME

TECHNICAL FIELD

The present invention relates to a heat transfer device and a heat transfer method using the same.

BACKGROUND ART

Hydrofluorocarbons (HFCs), such as HFC-125 and HFC-32, have been widely used as important substitutes for chlorofluorocarbons (CFCs), hydrochlorofluorocarbons (HCFCs), etc., which are known as substances that deplete the ozone layer. Known examples of such substitutes include "R-410A," which is a mixture of HFC-32 and HFC-125; "R-404A," which is a mixture of HFC-125, HFC-134a, and HFC-143a; etc.

The above substitutes have various applications, such as heat transfer media, refrigerants, foaming agents, solvents, cleaning agents, propellants, and fire extinguishers, and are consumed in large amounts. However, since these substances have a global warming potential (GWP) several thousand times higher than that of $CO_2$, many people are concerned that their diffusion may greatly affect global warming.

As a global warming countermeasure, the substances are collected after being used; however, not all of them can be collected, and their diffusion due to leakage cannot be disregarded. For use in refrigerants or heat transfer media, although $CO_2$ and hydrocarbon-based substances have been considered as substituents, $CO_2$ refrigerants have many difficulties, such as insufficient refrigeration efficiency under a high-temperature atmosphere and the requirement of large equipment. Hydrocarbon-based substances also pose safety problems due to their high flammability.

Hydrohaloolefins with a low GWP are recently attracting attention as substances that can solve these problems. Hydrohaloolefin is a generic name for unsaturated hydrocarbons containing hydrogen and halogen (e.g., fluorine and chlorine), and includes substances represented by the following chemical formulae. The description in parentheses following each chemical formula indicates the refrigerant number typically used in the field of refrigerants (including geometric isomers).

$CF_3CF=CF_2$ (HFO-1216yc),
$CF_3CF=CHF$ (HFO-1225ye),
$CF_3CF=CH_2$ (HFO-1234yf),
$CF_3CH=CHF$ (HFO-1234ze),
$CF_3CH=CH_2$ (HFO-1243zf)
$CF_3CCl=CH_2$ (HCFO-1233xf),
$CF_2ClCCl=CH_2$ (HCFO-1232xf),
$CF_3CH=CHCl$ (HCFO-1233zd),
$CF_3CCl=CHCl$ (HCFO-1223xd),
$CClF_2CCl=CHCl$ (HCFO-1222xd),
$CFCl_2CCl=CH_2$ (HCFO-1231xf), and
$CH_2ClCCl=CCl_2$ (HCO-1230xa).

Of these, fluoropropenes are particularly promising substances as candidates for low GWP refrigerants or heat transfer media; however, since fluoropropenes are gradually decomposed over time, they are not highly stable substances. Thus, when used in various applications, these substances have a problem of gradually reducing performance depending on the situation or environment. The performance is particularly reduced when air (oxygen) is entrapped in a refrigerant.

In general, in mobile air conditioners or like devices to which a refrigerant is charged at the factory under construction management, there is little possibility of an air (oxygen) entrapment problem. However, stationary air conditioners or like devices are required to be charged with a refrigerant on site. The charging of the refrigerant relies on the contractor's management ability. Thus, entrapped air (oxygen) has been considered to be a primary cause of failures and problems, such as reduction of refrigeration capacity.

A method for controlling the operation of a compressor system (turbo refrigerating machine) using conventional low-pressure refrigerant HCFC-123 has a risk of entrapping air from the outside into the refrigerant system because of the negative pressure in the system during operation. However, there may be the same risk even when hydrohaloolefin is used in place of HCFC.

Additionally, by using a magnetic bearing, a ceramic bearing, or an air bearing as a bearing that supports the axis of a motor driving a compression part that compresses a refrigerant in a compressor, an oil-free device has been recently developed in which the amount of the refrigerant oil to be used is limited to 5 parts by weight or less per 100 parts by weight of the refrigerant. This device can reduce costs and maintenance load involving the exchange of refrigerant oil etc., and can prevent the refrigerant dissolved in the refrigerant oil from discharging into the atmosphere. However, although an influence caused by the refrigerant oil can be reduced, hydrohaloolefin may be gradually decomposed when air (oxygen) is entrapped in the refrigerant.

In conventional HFC and HCFC refrigerants, simple replacement of such refrigerants can solve the problem. However, in hydrohaloolefin-containing refrigerants, oxidative degradation of the refrigerants may generate acid, which may corrode metal parts of the device, and thus necessitate equipment replacement.

CITATION LIST

PTL 1: Pamphlet of WO2008-27511

SUMMARY OF INVENTION

Technical Problem

An object of the present invention is to provide a heat transfer device in which a hydrohaloolefin-containing refrigerant is enclosed in a circulation route, the heat transfer device being capable of reducing the influence of oxygen entrapped in the circulation route; and a heat transfer method using the heat transfer device.

Solution to Problem

As a result of extensive research to achieve the above object, the present inventors found that the above object can be achieved by a heat transfer device that includes an oxygen adsorption device at a specific region in a refrigerant circulation route. Based on this finding, the present invention was accomplished.

Specifically, the present invention relates to the following heat transfer device and heat transfer method using the device.

1. A heat transfer device comprising a circulation route enclosing a refrigerant containing at least one member selected from the group consisting of hydrofluoroolefins (HFOs), hydrochlorofluoroolefins (HCFOs), and hydrochloroolefins (HCOs); and the device comprising an oxygen adsorption device between an evaporator and a compressor present in the circulation route.

2. A heat transfer device comprising a circulation route enclosing a refrigerant containing at least one member selected from the group consisting of hydrofluoroolefins (HFOs), hydrochlorofluoroolefins (HCFOs), and hydrochloroolefins (HCOs); and the device comprising an oxygen adsorption device in a region at a pressure of 1.0 MPa or less in the circulation route.

3. The heat transfer device according to Item 1 or 2, wherein the oxygen adsorption device comprises at least one of metal oxide-based oxygen adsorption materials or organic-based (sugar-based) oxygen adsorption materials.

4. The heat transfer device according to any one of Items 1 to 3, wherein the circulation route has an oxygen amount of 0.1 volume % or less.

5. The heat transfer device according to any one of Items 1 to 4, wherein the circulation route comprises refrigerant oil in addition to the refrigerant, and the refrigerant oil is contained in an amount of 5 parts by weight or less per 100 parts by weight of the refrigerant.

6. The heat transfer device according to any one of Items 1 to 5, comprising valves before and after the oxygen adsorption device in the circulation route.

7. The heat transfer device according to Item 5 or 6, wherein a bearing that supports an axis of a motor driving a compression part that compresses the refrigerant in the compressor present in the circulation route is a magnetic bearing, ceramic bearing, or air bearing.

8. A heat transfer method comprising circulating the refrigerant in the circulation route of the heat transfer device according to Item 1.

9. A heat transfer method comprising circulating the refrigerant in the circulation route of the heat transfer device according to Item 2.

Advantageous Effects of Invention

In the heat transfer device and the heat transfer method using the device according to the present invention, since the heat transfer device comprises an oxygen adsorption device at a specific region in a refrigerant circulation route, oxygen that is entrapped in the circulation route can be removed by the oxygen adsorption device, thus reducing oxygen influence against the refrigerant.

DESCRIPTION OF EMBODIMENTS

Figure 1:
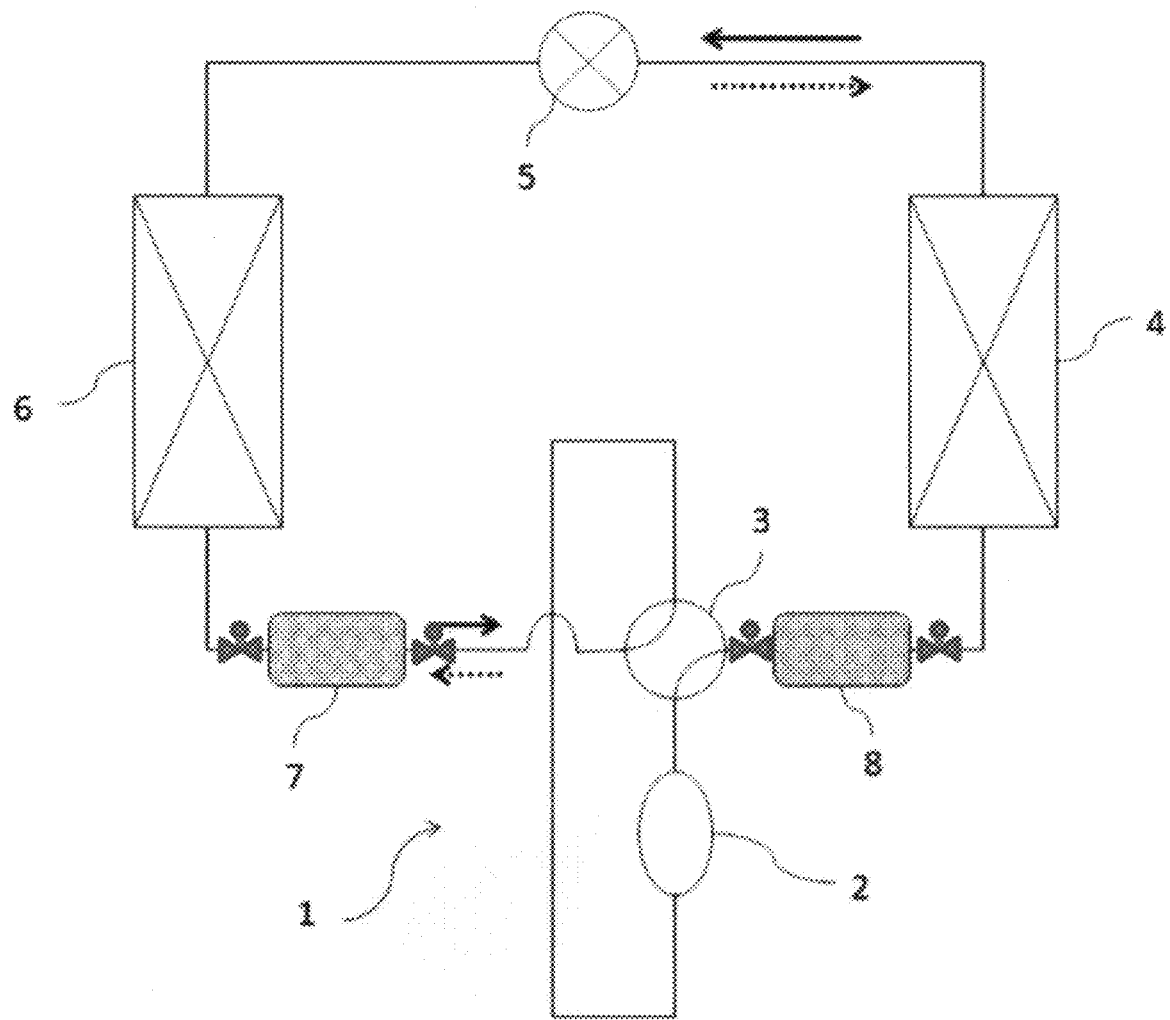
FIG. 1 shows an embodiment of a refrigerant circulation route in the heat transfer device (in particular, FIG. 1 shows an air conditioner) according to the present invention.

Heat Transfer Device of the Present Invention

The heat transfer device of the present invention comprises a circulation route enclosing a refrigerant containing at least one member selected from the group consisting of hydrofluoroolefins (HFOs), hydrochlorofluoroolefins (HCFOs), and hydrochloroolefins (HCOs) among hydrohaloolefins. The heat transfer device can be classified roughly into two groups, i.e., embodiment 1 and embodiment 2 described below.

Embodiment 1

A heat transfer device comprising a circulation route enclosing a refrigerant containing at least one member selected from the group consisting of hydrofluoroolefins (HFOs), hydrochlorofluoroolefins (HCFOs), and hydrochloroolefins (HCOs); and the device comprising an oxygen adsorption device between an evaporator and a compressor present in the circulation route.

Embodiment 2

A heat transfer device comprising a circulation route enclosing a refrigerant containing at least one member selected from the group consisting of hydrofluoroolefins (HFOs), hydrochlorofluoroolefins (HCFOs), and hydrochloroolefins (HCOs); and the device comprising an oxygen adsorption device in a region at a pressure of 1.0 MPa or less in the circulation route.

Embodiments 1 and 2 are separately explained below.

Heat Transfer Device According to Embodiment 1

The heat transfer device according to embodiment 1 comprises a circulation route enclosing a refrigerant containing at least one member selected from the group consisting of hydrofluoroolefins (HFOs), hydrochlorofluoroolefins (HCFOs), and hydrochloroolefins (HCOs); and the device comprises an oxygen adsorption device between an evaporator and a compressor present in the circulation route.

The refrigerant is not limited as long as it comprises at least one member selected from the group consisting of HFOs, HCFOs, or HCOs. Examples of HFOs include 2,3,3,3-tetrafluoropropene (HFO-1234yf), 1,3,3,3-tetrafluoropropene (HFO-1234ze), 1,2,3,3-tetrafluoropropene (HFO-1234ye), 1,1,2,3-tetrafluoropropene (HFO-1234yc), 1,2,3,3,3-pentafluoropropene (HFO-1225ye), 1,1,3,3,3-pentafluoropropene (HFO-1225zc), 3,3,3-trifluoropropene (HFO-1243zf), 1,1,1,4,4,4-hexafluoro-2-butene (HFO-1336mzz), 1,1,1,2,4,4,5,5,5-nonafluoropentene (HFO-1429myz), etc.

Examples of HCFOs include 2-chloro-3,3,3-trifluoropropene (HCFO-1233xf), 2,3-dichloro-3,3-difluoropropene (HCFO-1232xf), 1-chloro-3,3,3-trifluoropropene (HCFO-1233zd), 2-chloro-3,3,3-trifluoropropene (HCFO-1233xf), 2,3-dichloro-3,3-difluoropropene (HCFO-1232xf), 1,2-dichloro-3,3,3-trifluoropropene (HCFO-1223xd), 1,2,3-trichloro-3,3-difluoropropene (HCFO-1222xd), 2,3,3-trichloro-3-fluoropropene (HCFO-1231xf), etc.

Examples of HCOs include 1,3,3,3-tetrachloropropene (HCO-1230zd), 1,1,2,3-tetrachloropropene (HCO-1230xa), 1,1,3,3-tetrachloropropene (HCO-1230za), 2,3,3,3-tetrachloropropene (HCO-1230xf), etc.

These HFOs, HCFOs, and HCOs can be used singly or as a mixture of two or more. It is also possible to mix refrigerants other than HFOs, HCFOs, and HCOs. In this case, adjusting the total amount of HFOs, HCFOs, and HCOs in the refrigerant mixture to 50 wt % or more is preferable.

Examples of other refrigerants include HFC-32, HFC-41, HFC-125, HFC-134, HFC-143, HFC-152, HFC-227, HFC-236, HFC-245, HFC-338, HFC-347, HFC-356, HFC-365, HFC-449, HFC-43-10, HFE-125, HFE-134, HFE-143, HFE-152, HFE-236, HFE-245, HFE-254, HFE-338, HFE-347, HFE-356, HFE-365, HFE-449, etc. When the above compounds have isomers, any isomers can be included. Examples further include hydrocarbons having a carbon number of 1 to 5 (for those having isomers, any isomers are included), $CO_2$, etc. The refrigerant may comprise one or two or more of these other refrigerants.

Examples of mixtures of other refrigerants and at least one member selected from the group consisting of HFOs, HCFOs, and HCOs include R-444A, R-444B, R-445A, R-446A, R-447A, R-448A, R-449A, R-449B, R-450A, R-451a, R-451B, R-452A, R-454A, R-454B, R-455A, R-513A, R-513B, etc.

In the present invention, the refrigerant (or the refrigerant mixture) enclosed in the circulation route may consist of at least one member selected from the group consisting of HFOs, HCFOs, and HCOs.

In the heat transfer device of the present invention, the refrigerant (hereinbelow a refrigerant mixture is also abbreviated as "refrigerant") comprising at least one of HFOs, HCFOs, or HCOs is enclosed in the refrigerant circulation route in the device, and heat is transferred by passing the refrigerant through each device disposed in the circulation route.

The purpose of the heat transfer device is not limited. A wide variety of applications include heat transfer apparatuses, such as air conditioners (mobile air conditioners, domestic air conditioners, and air conditioners for business use), refrigerating machines, refrigerators, coolers (chillers), container refrigerating apparatuses, and hot-water supply systems. A specific example of the heat transfer device of the present invention is explained below with reference to the air conditioner (see FIG. 1) or the turbo refrigerating machine (see FIG. 2), which is one of the vapor compression heat transfer devices.

FIG. 1 shows an embodiment of the refrigerant circulation route in the heat transfer device (air conditioner in the following explanation) of the present invention. The air conditioner 1 mainly consists of a compressor 2, a four-way switching valve 3, an outdoor heat exchanger 4, an expansion mechanism 5, and an indoor heat exchanger 6. In FIG. 1, the solid arrow indicates the refrigerant circulation direction during cooling while the dotted arrow indicates the refrigerant circulation direction during heating. The refrigerant circulation direction can be controlled by allowing the refrigerant discharged from the compressor 2 to select the outdoor heat exchanger 4 direction or indoor heat exchanger 6 direction using the operation of the four-way switching valve 3.

The refrigeration cycle of the air conditioner 1 during cooling is explained. First, the compressor 2 compresses a low-pressure gas refrigerant and discharges a high-pressure gas refrigerant. The refrigerant discharged from the compressor 2 passes through the four-way switching valve 3 and is supplied to the outdoor heat exchanger 4. The outdoor heat exchanger 4 condenses a high-pressure gas refrigerant and discharges a high-pressure liquid refrigerant. The refrigerant discharged from the outdoor heat exchanger 4 passes through the expansion valve of the expansion mechanism 5 and becomes a refrigerant in the low-pressure gas-liquid mixing state. The refrigerant is then supplied to the indoor heat exchanger 6. The indoor heat exchanger 6 allows the refrigerant in the low-pressure gas-liquid mixing state to evaporate, and discharges a low-pressure gas refrigerant. The low-pressure gas refrigerant discharged from the indoor heat exchanger 6 is supplied to the compressor 2. This refrigeration cycle can cool a room.

During cooling, the outdoor heat exchanger 4 functions as a condenser and the indoor heat exchanger 6 functions as an evaporator. Specifically, evaporative latent heat of a refrigerant generated in the indoor heat exchanger 6 cools a room. On the other hand, during heating, by switching the four-way switching valve 3, the outdoor heat exchanger 4 functions as an evaporator and the indoor heat exchanger 6 functions as a condenser. Specifically, condensed latent heat of a refrigerant generated in the indoor heat exchanger 4 heats a room.

Figure 2:
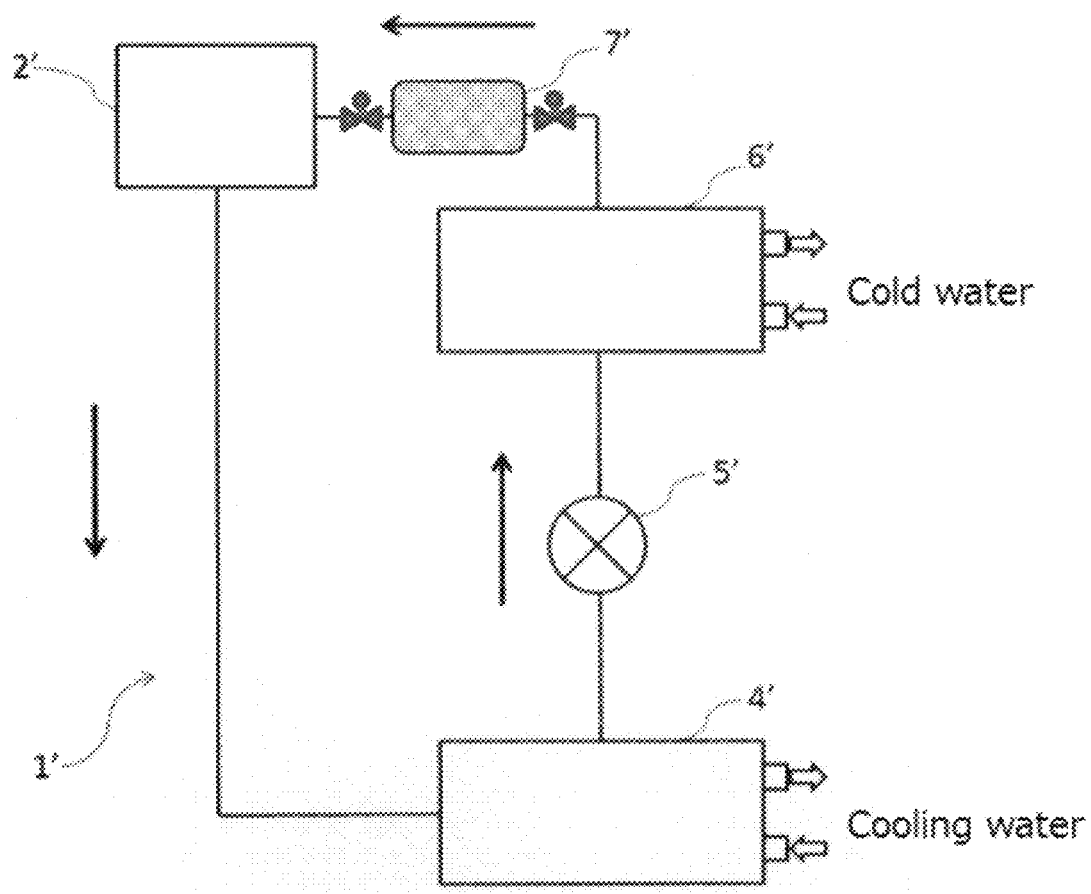
FIG. 2 shows an embodiment of a refrigerant circulation route in the heat transfer device (in particular, FIG. 2 shows a turbo refrigerating machine) according to the present invention.
Figure 3:
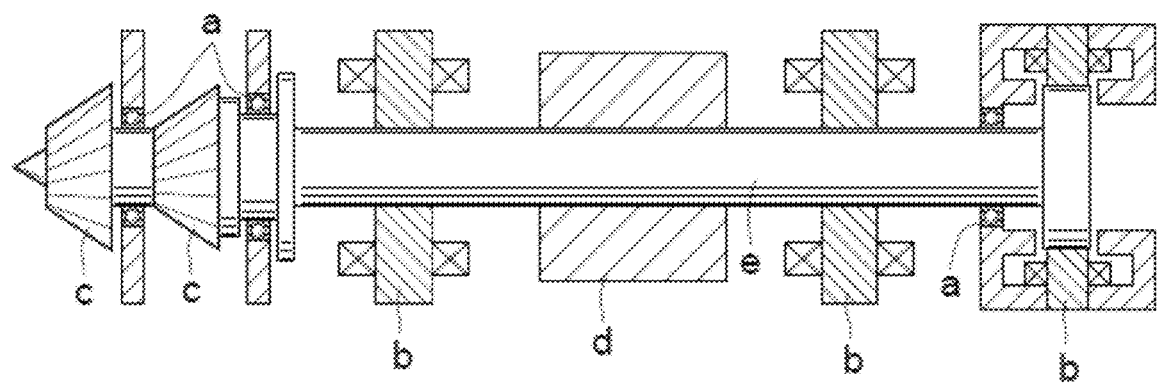
FIG. 3 illustrates a cross-sectional structural diagram of a typical compressor (including a bearing), wherein a. is a ceramic bearing or air bearing, b. is a magnetic bearing, c. is an impeller, d. is a motor, and e. is a shaft (axis).

FIG. 2 shows an embodiment of a refrigerant circulation route in the heat transfer device (turbo refrigerating machine in the following explanation). The turbo refrigerating machine 1' mainly consists of a compressor 2', a condenser 4', an expansion mechanism 5', and an evaporator 6'.

The solid arrow in FIG. 2 shows the refrigerant circulation direction. In this refrigeration cycle, the compressor 2' compresses a low-pressure gas refrigerant and discharges a high-pressure gas refrigerant. The refrigerant discharged from the compressor 2' is supplied to the condenser 4'. The condenser 4' condenses a high-pressure gas refrigerant and discharges a high-pressure liquid refrigerant. The refrigerant discharged from the condenser 4' passes through the expansion valve of the expansion mechanism 5' and becomes a refrigerant in the low-pressure gas-liquid mixing state. The refrigerant is then supplied to the evaporator 6'. The evaporator 6' allows the refrigerant in the low-pressure gas-liquid mixing state to evaporate and discharges a low-pressure gas refrigerant. The low-pressure gas refrigerant discharged from the evaporator 6' is supplied to the compressor 2'. In this refrigeration cycle, cool wind formed of cool water that is obtained by the function of the evaporator 6' is used for cooling a large-scale space.

The heat transfer device of the present invention comprises an oxygen adsorption device between the evaporator and the compressor present in the refrigerant circulation route. In FIG. 1, during cooling, since the outdoor heat exchanger 4 functions as a condenser and the indoor heat exchanger 6 functions as an evaporator, the oxygen adsorption device 7 is provided between the evaporator 6 and the compressor 2. In contrast, during heating, since the outdoor heat exchanger 4 functions as an evaporator and the indoor heat exchanger 6 functions as a condenser, the oxygen adsorption device 8 is provided between the evaporator 4 and the compressor 2. In either case of cooling or heating, the low-pressure gas refrigerant is present between the evaporator and the compressor. Thus, as the gas refrigerant passes through the oxygen adsorption device, oxygen can be removed from the gas refrigerant. In FIG. 2, an oxygen adsorption device 7' is provided between the evaporator 6' and the compressor 2'.

In the heat transfer device of the present invention, valves (not shown) are provided before and after the oxygen adsorption device, and the oxygen adsorption device is removably mounted on the circulation route so that an oxygen adsorption material that adsorbs oxygen in the oxygen adsorption device can be easily removed or exchanged. Both manual and electric valves can be used as long as the valves are provided in the circulation route in a manner such that the flow of the refrigerant against the oxygen adsorption device can be controlled.

The inside of the oxygen adsorption device is filled with the oxygen adsorption material. Oxygen is selectively adsorbed (absorbed) and removed from the gas refrigerant when oxygen passes through the oxygen adsorption device together with the gas refrigerant. Such oxygen adsorption materials are not limited as long as materials can selectively adsorb oxygen, and examples thereof include metal oxide-based oxygen adsorption materials and organic-based (sugar-based) oxygen adsorption materials. Such oxygen adsorption materials can be used singly or as a mixture of two or more. Metal oxide-based oxygen adsorption materials are preferred because the oxygen adsorption speed is fast. The oxygen adsorption material can be any form as long as the material is permeable to the gas refrigerant. Examples of the form of the oxygen adsorption material include powders, pellets, etc. Films or filters in which the oxygen adsorption material is adhered or immersed can also be used. Because the present invention includes the oxygen adsorption device filled with such an oxygen adsorption material, the amount of oxygen in the circulation route can be maintained at 0.1 volume % or less. This can reduce decomposition over time caused by oxygen of the refrigerant containing at least one of HFOs, HCFOs, or HCOs.

The metal oxide-based oxygen adsorption material is an adsorption material that adsorbs oxygen by oxidation reaction (heat generation). In the present invention, a metal (Fe and/or Ce) oxide-based oxygen adsorption material is preferably used to selectively adsorb oxygen. Various conventionally known metal oxide-based oxygen adsorption materials can be used.

The organic-based (sugar-based) oxygen adsorption material is an adsorption material that removes oxygen from the gas refrigerant by oxidation reaction ($CO_2$ release). Various conventionally known organic-based (sugar-based) oxygen adsorption materials can be used.

The oxygen adsorption device used in the present invention may be a dedicated member filled with the oxygen adsorption material. The oxygen adsorption device may also serve as a drying device (drier) that is provided in the refrigerant circulation route in a known heat transfer device. In this case, by filling the drier with a drying material and an oxygen adsorption material, the drier can be used as a member for simultaneously removing water and oxygen entrapped in the gas refrigerant.

As long as the heat transfer device of the present invention uses a magnetic bearing, a ceramic bearing, or an air bearing as a bearing that supports the axis of a motor driving the compression part compressing the refrigerant in the compressor, it may be an oil-free heat transfer device in which the amount of the refrigerant oil to be used is limited to 5 parts by weight or less per 100 parts by weight of the refrigerant. The above bearing does not require refrigerant oil for improving the lubricity of the bearing in addition to the refrigerant, and the amount of the refrigerant oil can be substantially set to 0 parts by weight. However, considering oil (grease etc.) entrapped during the construction of the heat transfer device, the amount of the refrigerant oil is preferably 5 parts by weight or less.

Heat Transfer Device According to Embodiment 2

The heat transfer device according to embodiment 2 comprises a circulation route enclosing a refrigerant containing at least one of hydrofluoroolefins (HFOs), hydrochlorofluoroolefins (HCFOs), or hydrochloroolefins (HCOs); and the device comprises an oxygen adsorption device in a region at a pressure of 1.0 MPa or less in the circulation route.

In embodiment 2, the heat transfer device is not limited except that the oxygen adsorption device is placed in the low-pressure region at a pressure of 1.0 MPa or less in the refrigerant circulation route. The other structures are the same as the heat transfer device of embodiment 1. In the refrigerant circulation route, the low-pressure region at a pressure of 1.0 MPa or less has an increased risk of absorbing outside air, as compared to another region (a region at a pressure exceeding 1.0 MPa), and oxygen may be easily entrapped in the circulation route. Accordingly, the oxygen adsorption device provided at such a low-pressure region can efficiently prevent the influence of oxygen entrapment. Although the maximum pressure in the entire refrigerant circulation is not limited, it is usually about 3.0 MPa.

The heat transfer device according to embodiment 2 includes an oxygen adsorption device in the refrigerant circulation route. The position of the oxygen adsorption device is not limited as long as it is in the low-pressure region at a pressure of 1.0 MPa or less; however, oxygen can be efficiently adsorbed in a place where the refrigerant and oxygen are present in a gas phase. Accordingly, as in the case of the heat transfer device of embodiment 1, the oxygen adsorption device is preferably positioned between the evaporator and compressor and in the low-pressure region at a pressure of 1.0 MPa or less. Since embodiment 2 also includes the oxygen adsorption device that is filled with the oxygen adsorption material, the amount of oxygen in the circulation route can be preferably maintained at 0.1 volume % or less, thus reducing decomposition over time caused by oxygen of a refrigerant containing at least one of HFOs, HCFOs, or HCOs.

Heat Transfer Method of the Present Invention

The heat transfer method of the present invention can be performed by circulating the refrigerant in the refrigerant circulation route of the heat transfer device according to the present invention. Specifically, the circulation of refrigerant is explained as above by referring to the examples of the air-conditioner (FIG. 1) and the turbo refrigerating machine (FIG. 2).

DESCRIPTION OF REFERENCE NUMERALS

1 Heat transfer device (Air conditioner in FIG. 1)
2 Compressor
3 Four-way switching valve
4 Outdoor heat exchanger (Condenser during cooling and evaporator during heating)
5 Expansion mechanism
6 Indoor heat exchanger (Evaporator during cooling and condenser during heating)
7 Oxygen adsorption device (during cooling)
8 Oxygen adsorption device (during heating)
1' Heat transfer device (Turbo refrigerating machine in FIG. 2)
2' Compressor
4' Condenser
5' Expansion mechanism
6' Evaporator
7' Oxygen adsorption device

The invention claimed is:
1. A heat transfer device comprising a circulation route enclosing a hydrochlorofluoroolefin (HCFO)-containing refrigerant;
the device serving as a chiller, which cools water, and a turbo refrigerating machine;
the device comprising an oxygen adsorption device in a region at a pressure of 1.0 MPa or less, in which the pressure is negative relative to outside of the circulation route, between an evaporator and a compressor in the circulation route; and the oxygen adsorption device being a device wherein the inside of the oxygen adsorption device is filled with an oxygen adsorption material, and oxygen is selectively adsorbed and/or absorbed and removed from a gas refrigerant when oxygen passes through the oxygen adsorption device together with the gas refrigerant.

2. A heat transfer method comprising circulating the refrigerant in the circulation route of the heat transfer device according to claim 1.

3. The heat transfer device according to claim 1, wherein the oxygen adsorption device comprises at least one of metal oxide-based oxygen adsorption materials or organic-based oxygen adsorption materials.

4. The heat transfer device according to claim 1, wherein the circulation route has an oxygen amount of 0.1 volume % or less.

5. The heat transfer device according to claim 1, wherein the circulation route comprises a refrigerant oil in addition to the refrigerant, and the refrigerant oil is contained in an amount of 5 parts by weight or less per 100 parts by weight of the refrigerant.

6. The heat transfer device according to claim 5, wherein a bearing that supports an axis of a motor driving the compressor present in the circulation route is a magnetic bearing, ceramic bearing, or air bearing.

7. The heat transfer device according to claim 1, comprising valves before and after the oxygen adsorption device in the circulation route.

* * * * *